United States Patent [19]

Morin

[11] 4,283,086
[45] Aug. 11, 1981

[54] BODY FOR VEHICLES AND VEHICLES CARRYING SAID BODY

[75] Inventor: Andre M. R. Morin, Chatillon sur Thonet, France

[73] Assignee: SOVAM, Parthenay, France

[21] Appl. No.: 74,746

[22] Filed: Sep. 12, 1979

[30] Foreign Application Priority Data

Sep. 14, 1978 [FR] France .................................. 78 26482
Apr. 17, 1979 [FR] France .................................. 79 09671

[51] Int. Cl.³ ............................................. B62D 29/04
[52] U.S. Cl. .................................. 296/178; 296/31 P; 296/197; 296/29; 296/39 A; 52/79.9
[58] Field of Search ............... 296/197, 193, 191, 196, 296/29, 31 P, 39 A, 178, 183; 52/79.1, 79.9

[56] References Cited

U.S. PATENT DOCUMENTS

| 2,606,058 | 8/1952 | Chausson | 296/178 |
| 3,100,458 | 8/1963 | Baker et al. | 296/31 P |
| 3,188,131 | 6/1965 | Attwood | 296/183 |
| 3,794,373 | 2/1974 | Manning | 296/31 P |
| 3,881,765 | 5/1975 | Cerra et al. | 296/178 |

Primary Examiner—Robert R. Song
Attorney, Agent, or Firm—Wolf, Greenfield & Sacks

[57] ABSTRACT

The invention relates to a body for vehicles, as well as to vehicles carrying such a body, wherein the side surfaces of said body consist of modular elements assembled to one another, each of said modular element having an angle extension forming at least a portion of the roof of said body.

15 Claims, 5 Drawing Figures

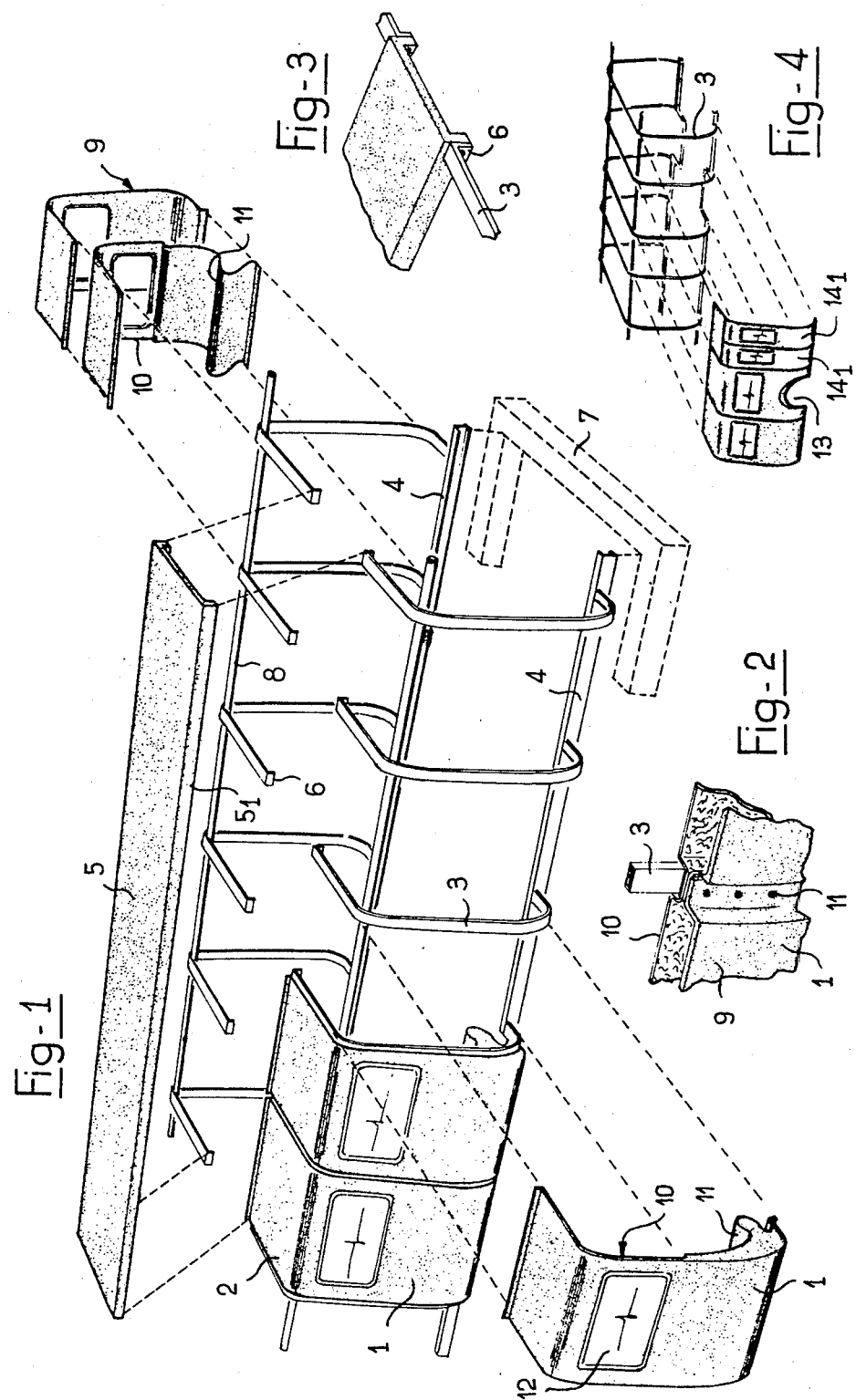

BODY FOR VEHICLES AND VEHICLES CARRYING SAID BODY

The invention relates to a body for vehicles as well as to vehicles carrying said body.

The body provided by the invention is characterized in that the side surfaces of said body consist of modular elements assembled to one another, said modular elements having an angle extension forming at least a portion of the roof of said body.

According to a further characteristic feature of the invention, the modular elements are assembled to one another on frame sections of the same shape distributed in vertical planes along the length of the body.

According to a further characteristic feature of the invention, the angle extension of the opposite modules of the side surfaces are connected to each other by a central beam.

According to a further characteristic feature of the invention, each of the modular elements consists of a double wall the interior of which is filled with an insulating material.

According to a further characteristic feature of the invention, the internal wall of the modular element supports seats.

According to a further characteristic feature of the invention, the seats supported by the internal wall comprise a part of said internal wall.

According to a further characteristic feature of the invention, the side edges of the walls of each modular element are bent and fixed on to a frame section, and the assembly thus made by said side edges and said frame sections constituting a positioning key for two modules assembled to one another in succession.

According to a further characteristic feature of the invention, the frame consists of two round sections connected to one another by a flat bar forming the median area of the frame.

According to a further characteristic feature of the invention, a resiliant joint is fitted between the frame and the bent ends of the two successive modules.

According to a further characteristic feature of the invention, the body carries a sealing gasket fixed onto the external faces of the walls of two successive modules within the junction area of said modules.

The invention is shown by way of a non-limiting example in the attached drawings, wherein:

FIG. 1 is an expoded view in perspective of a vehicle body provided by the invention.

FIG. 2 is a fragmentary perspective view showing the mode of assembling of the modular elements together.

FIG. 3 is a fragmentary perspective view showing the manner in which the central beam is connected to the frame sections.

FIG. 4 is a diagrammaric view in perspective and expoded of another embodiment of the vehicle body of the invention.

Figure 5:
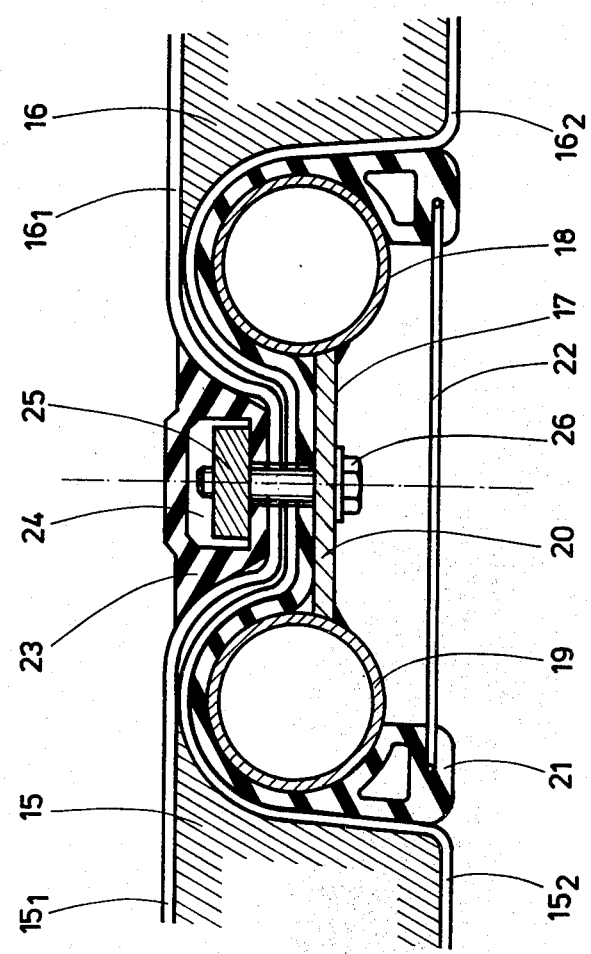
FIG. 5 is a cross-section view from above of two modular elements of a vehicle body.

The present invention is aimed at producing a body of vehicles, drawn or self-propelling as, for example a bus, whose size can rapidly be adapted for the function thereof, without it being necessary to modify its structure nor particularly the shape and size of the essential components of said structure.

Also, the present invention is aimed at permitting a quick mounting and assembling of the modular elements, for either performing repairs or replacement of one of the modular elements constituting the body of the vehicle.

Also, the present invention is aimed at increasing the elasticity of all very lengthy vehicle bodies without destroying or deforming the modular elements.

Also, the body provided by the invention has the advantage of being quickly dismounted element by element, for example for performing local repairs such that internal equipment (wall covering, seats, mechanical parts), may be attached to the body elements before they are mounted thereon.

According to the invention, the side walls of the body consist of modular elements 1 which are fixed side by side on each side of the vehicle, said modular elements 1 having an angle extension 2 at their upper portions so as to constitute the roof of the body or a part thereof.

As shown in FIG. 1, the elements 1 are connected to one another by vertical frame sections 3 having the same shape as that of the body, in the transversal direction thereof. The frame sections are connected in parallel by longitudinal girders 4 at their lower portions.

Also, as shown in FIG. 1, the extensions 2 do not constitute the totality of the roof whose additional part consists of a longitudinal beam 5.

Longitudinal beam 5 has longitudinal flanges $5_1$ designed to be connected to the extension 2 of the modular elements 1, by bolts or similar fasteners, and to the angles 6 (see FIG. 3) formed at the upper ends of the frame sections 3.

The longitudinal beam 5, in view of the independent manufacture thereof from the remaining of the body, can be made in the form of a compartment or technical caisson containing the lighting circuit elements, as well as the ventilation, air-conditioning, etc.

The framework consisting of the frame sections 3 and the longitudinal girders 4 is secured to the base frame 7 of the vehicle, and longitudinal sections 8 are provided in the upper angle of the body so as to increase the rigidity of the construction.

However, it will be noted that the modular elements 1 constitute in themselves rigid cross-bars which cooperate to ensure a strong construction on the framework 7.

The modular elements 1 and the extension 2 thereof which define the shape of the body, all preferably consist of a double wall 9 and 10, constituting the internal face and the external face thereof, and the space between said two walls being filled with a filling material, for example foam of polystyrene, increasing the solidity and the thermic and phonic isolations of the body. The rigidity of the whole framework is also enhanced by the assembly of the elements 1 superposed to one another (see FIG. 2), the superposed edges being themselves assembled to the frame sections 3 by means of screws or the like.

As shown in FIG. 1, the wall 10 which constitutes the internal face of the body, is shaped so as to simultaneously constitute the seats 11 of the body, said seats being positioned as a row along the longitudinal walls of the body in view of the side by side positioning of the modular elements 1. Also, said modular elements 1 can carry windows 12 which are thus positioned on the body of the vehicle without necessitating any special supporting frame.

As shown in FIG. 4, the longitudinal side frame made up of frame sections 3 are connected directly to one another by their upper portions which form part of the roof, and the body thus constructed has a minimum width. On the otherhand, as shown in FIG. 1, the width of the very same vehicle can quickly be enlarged in course of manufacture by adjusting the space between the side frames and positioning beam 5 between them.

The basic modular element can itself, consist of two half-elements $14_1$, $14_2$ as shown in FIG. 4; which can serve as a door when a hinged mounting is provided, or to build up caissons whose lengths are adjustable to nearly a half-module when assembled to other modules.

As shown in FIG. 5, the body of the vehicle consists of modular elements 15, 16 whose assembling technique provides a certain elasticity particularly desirable for very lengthy bodies in addition this embodiment has the advantage of being easily dismountable.

The modular elements 15 and 16 comprise walls $15_1$, $15_2$, and $16_1$, $16_2$, respectively. The ends of the walls $15_1$, $15_2$, and $16_1$, $16_2$ of each modular element are close together at their free ends. The walls $15_1$, $15_2$, and $16_1$, $16_2$ are connected to a framework 17. Said framework 17 includes two round sections 18 and 19 joined to each other by a flat bar 20 which forms the median area of the framework 17.

A resiliant gasket 21 is inserted between the framework 17 and the walls $15_2$ and $16_2$ of the modules 15 and 16. The gasket 21 is preshaped; it ensures a firm connection of the walls $15_1$, $15_2$, and $16_1$, $16_2$, to the framework 17. The gasket 21 carries in addition a covering plate 22 located at the side edges of the internal faces of the modules 15 and 16. The plate has an ornamental effect and hides the framework 17 and the edges of the modules 15 and 16 bent on the framework 17.

A sealing gasket 23 is fixed on the external face of the modules 15 and 16. Said sealing gasket 23 includes a housing 24 which receives a flat bar 25 making it possible to clamp the two modules 15 and 16 onto the framework 17 by means of a screw 26. The latter engages the tapped flat bar 25. It ensures the assembling of the walls $15_1$, $15_2$, and $16_1$, $16_2$ onto the framework 17 while clamping the gasket 23 to the body. The gasket 23 simultaneously ensures the clamping of the modular elements 15 and 16 onto the framework 17 and the seals the joint of the two modular elements.

What I claim is:

1. A vehicle body comprising a plurality of identical modular elements connected side by side to each other to define one side of the body, additional identical modular elements defining the other side of the body, each of said modular elements including an upper portion that forms part of the roof of the body,
   a central beam running longitudinally of the body along the center of the roof of the body,
   and angles provided on the ends of the modules for connecting the side walls to the beam.

2. A vehicle body as defined in claim 1 further characterized by a plurality of frame sections arranged in horizontally spaced vertical planes which join the modular elements together.

3. A vehicle body as defined in claim 2 further characterized by each of said frame sections being connected to the beam.

4. A vehicle body as defined in claim 1 further characterized by a window provided in each modular element.

5. A vehicle body as defined in claim 1 further characterized by each of said modular elements including inner and outer walls defining a cavity therebetween, and a filling material filling the cavity.

6. A vehicle body as defined in claim 1 further characterized by seats formed as an integral part of the interior walls of the elements.

7. A vehicle body as defined in claim 2 further characterized by longitudinally extending girders connecting the frame sections together.

8. A vehicle body as defined in claim 1 further characterized by said central beam having a substantial width, and said beam including technical services for the interior of the vehicle.

9. A vehicle body comprising
   parallel side walls each made up of a plurality of identical modular elements,
   frame sections lying in vertical planes and joining each adjacent pair of modular elements, said frame sections being made up of a pair of parallel, spaced apart rod-like members joined by an intermediate rigid member,
   flanges provided on the side edges of each of the modular elements and bent around the rod like members,
   and means fastening the flanges of adjacent elements to the spaced apart parallel rod-like members of one of the frame sections.

10. A vehicle body as defined in claim 9 further characterized by said rod-like members being round tubular sections and the intermediate rigid members being a flat bar.

11. A vehicle body as defined in claim 10 further characterized by a resilient gasket mounted about each tubular section beneath the flange on the side edges of the modular elements.

12. A vehicle body as defined in claim 11 further characterized by a covering plate connected between the gaskets on the tubular sections of each frame section to cover the interior of the frame section.

13. A vehicle body as defined in claim 12 further characterized by a sealing gasket disposed outside each of the frame sections and engaging the adjacent edges of the modular elements.

14. A vehicle body as defined in claim 13 further characterized by an opening in the sealing gasket, a flat bar disposed in the opening, and screws passing through the flat bars to secure the sealing gasket in place.

15. A vehicle body as defined in claim 9 further characterized by a central beam running longitudinally of the body at the roof thereof,
   and means provided in the module elements and frame sections joining their upper ends to the beam.

* * * * *